United States Patent [19]

Brown

[11] 4,381,568

[45] May 3, 1983

[54] COMBINATION POTTY SEAT AND STEP STOOL

[76] Inventor: Charles W. Brown, 1053 Reasor Ave., Louisville, Ky. 40217

[21] Appl. No.: 331,041

[22] Filed: Dec. 16, 1981

[51] Int. Cl.³ ............................................. A47K 13/06
[52] U.S. Cl. ...................................... 4/239; D23/53
[58] Field of Search ................ 4/483, 234, 235, 237, 4/239, 661, 478; 297/250, 252, 257, 232, 234, 118, 1, 3; 182/33; D23/53, 71

[56] References Cited

U.S. PATENT DOCUMENTS

| | | | |
|---|---|---|---|
| 932,592 | 8/1909 | Stein | 4/239 |
| 1,297,177 | 3/1919 | Johnson | 4/239 |
| 2,127,020 | 8/1938 | Carlson | 4/239 |
| 2,568,322 | 9/1951 | Cunningham | 4/239 |
| 2,607,926 | 8/1952 | De Puy | 182/33 |
| 2,666,210 | 1/1954 | Wiley | 4/478 |
| 2,940,086 | 6/1960 | Wondrack | 4/239 |
| 3,971,077 | 7/1976 | O'Neil | 4/239 |

Primary Examiner—Stephen Marcus
Assistant Examiner—Kenneth S. Putnam
Attorney, Agent, or Firm—Richard L. Caslin

[57] ABSTRACT

A children's potty seat is shown for use in the toilet training of infants. This potty seat is designed to be mounted to the toilet seat of a toilet bowl. An important feature of this invention is that the mounting means for the potty seat is located toward the rear of the seat so that when the seat is inverted and positioned on the floor in front of the toilet bowl, the mounting means do not constitute an obstruction which would make it difficult for a child to stand on the inverted potty seat in the manner of a step stool. The rear portion of the potty seat is specially designed so that when the seat is used as a step stool, the stool may be positioned closely adjacent the front of the toilet bowl so that a small boy may reach the toilet bowl. In other words, the inverted potty seat has a telescoping relationship with the base of the toilet bowl.

5 Claims, 7 Drawing Figures

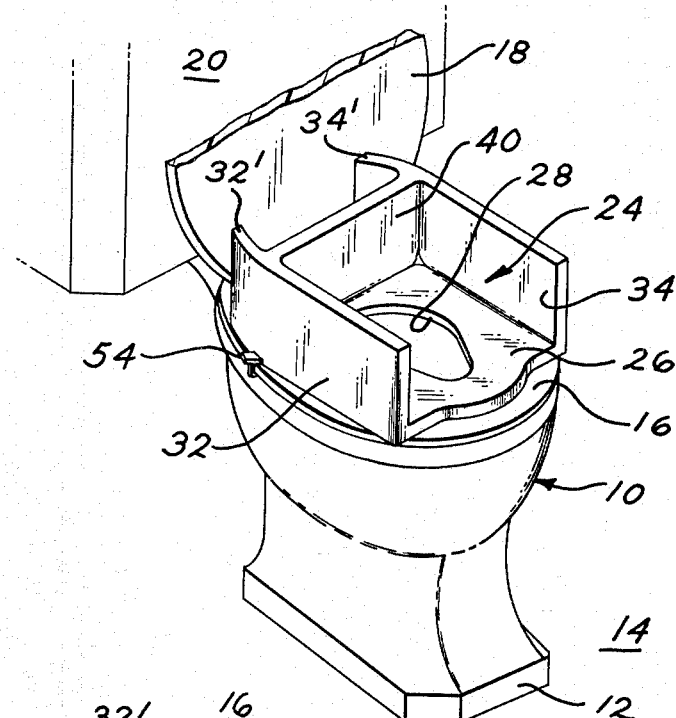
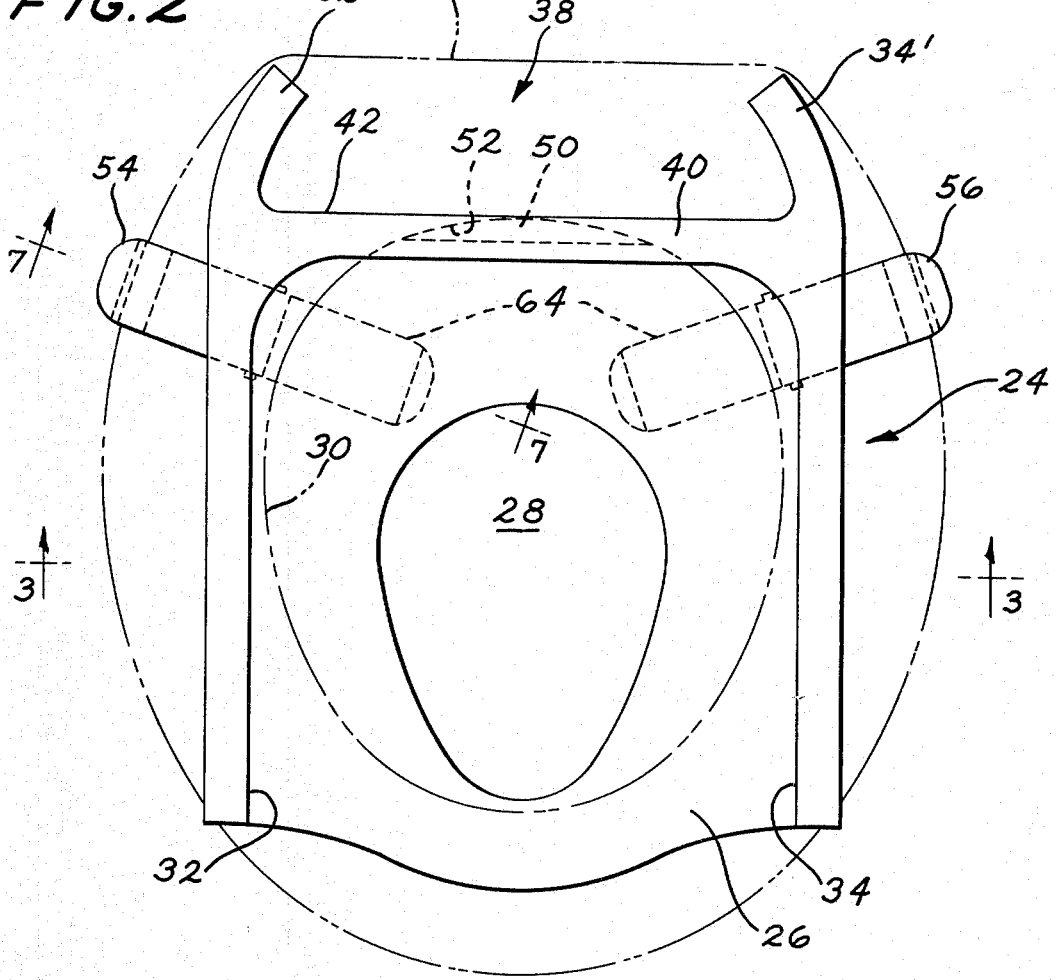

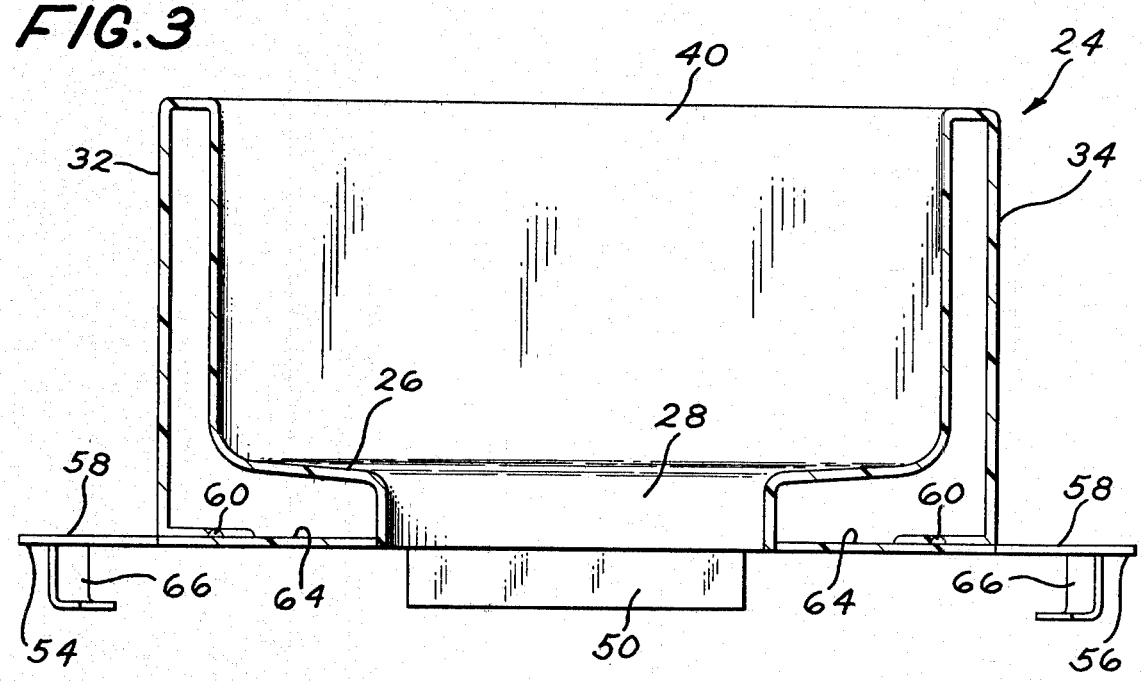
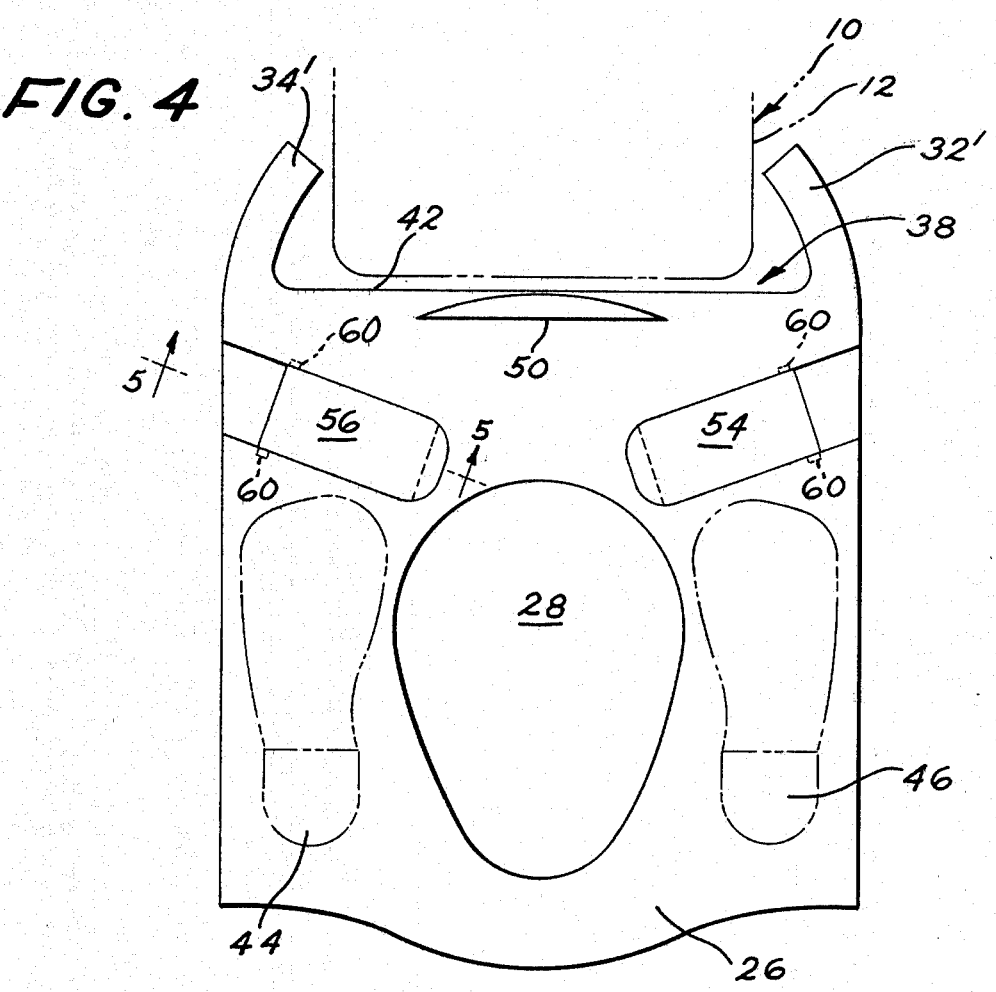

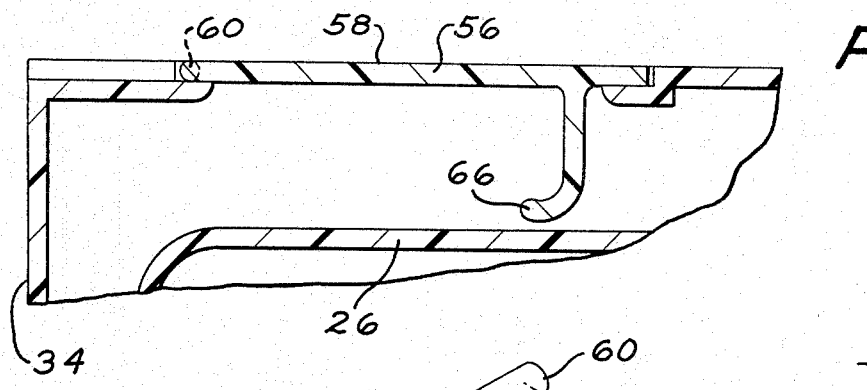
FIG. 5
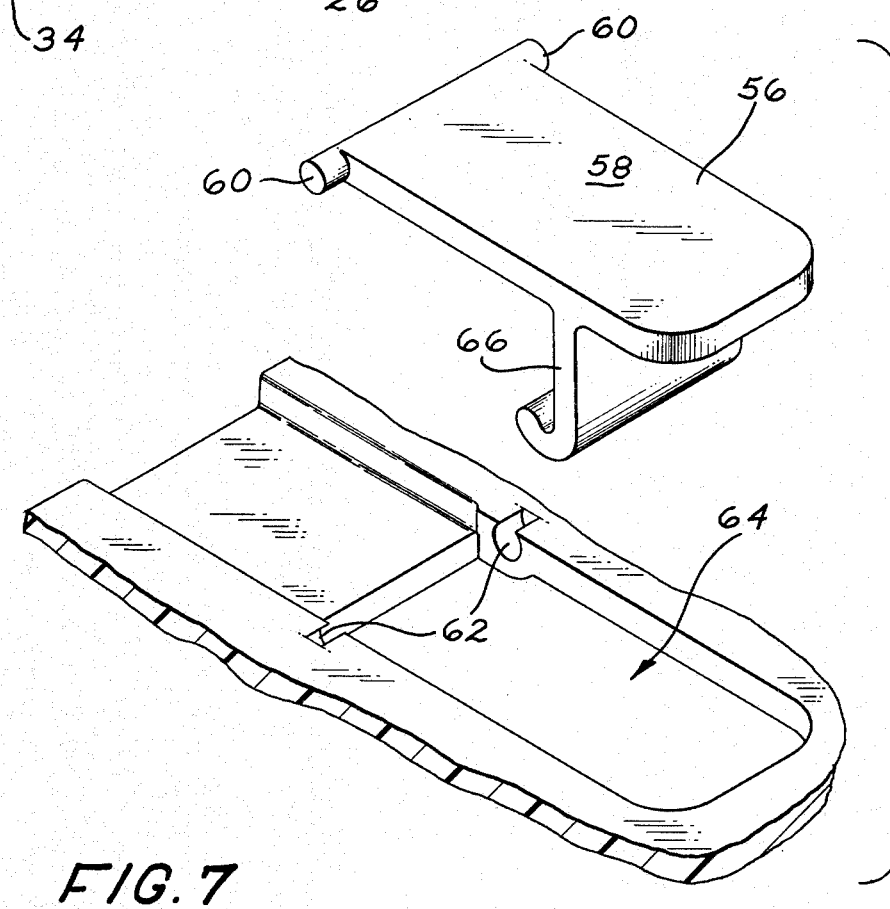
FIG. 6
FIG. 7
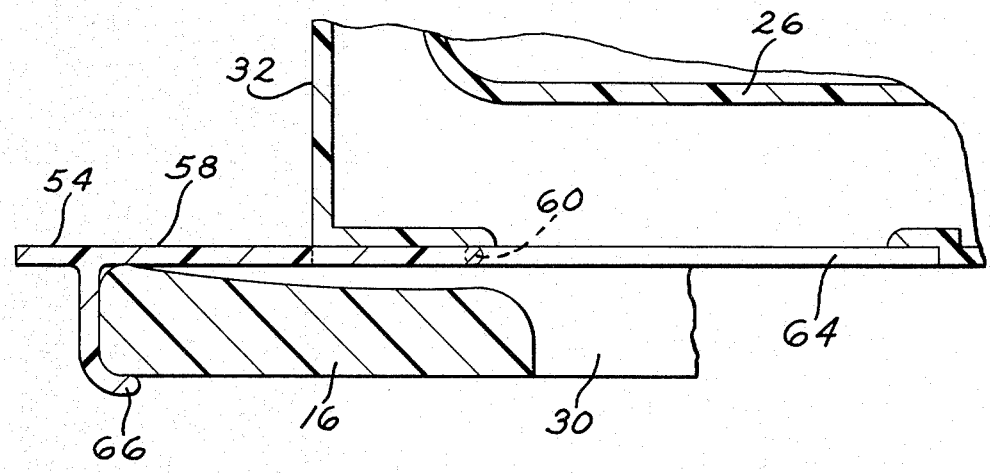

COMBINATION POTTY SEAT AND STEP STOOL

BACKGROUND OF THE INVENTION

1. Field of the Invention

This invention relates to a combined children's potty seat and step stool for use in the toilet training of infants. This potty seat is adapted to be installed over the toilet seat of a toilet bowl. Moreover this potty seat may be inverted and placed on the floor in front of the toilet bowl for use as a step stool by the boy infants as they develop.

2. Description of the Prior Art

It is old in the prior art to provide children's potty seats that may be installed over the toilet seat of a toilet bowl. These designs are found in the following patents: Stein U.S. Pat. No. 932,592, Carlson U.S. Pat. No. 2,127,020, Cunningham U.S. Pat. No. 2,568,322, and Wondrack U.S. Pat. No. 2,940,086.

However, none of these above-identified patents show potty seat designs which may be inverted and positioned on the floor in front of the toilet bowl for use as a step stool, as is described in the present invention. The potty seat of the Cunningham U.S. Pat. No. 2,568,322 has some visual characteristics of the present invention, but it should be noted that the Cunningham seat is designed to be collapsible. The horizontal seat is split into two sections which are hinged together, and the side arm panels are also hinged to the seat. If this Cunningham design were inverted to use as a step stool, the assembly would collapse if a child were to attempt to stand upon it.

The Wiley U.S. Pat. No. 2,666,210 shows a combined child's toilet training seat and step stool, but this training seat is not adapted to be installed to the toilet seat of a toilet bowl. It is a miniature design for use on the floor as a portable toilet, and it has a pivoted backrest which may be folded down to serve as a cover for the toilet, or as the platform of a converted step stool.

OBJECTS OF THE PRESENT INVENTION

The principal object of the present invention is to provide a children's potty seat with improved mounting means for installing the seat to the toilet seat of a toilet bowl for the safety and comfort of the users.

A further object of the present invention is to provide a children's potty seat of the class described which may be inverted and placed upon the floor in front of the toilet bowl for use as a step stool by the infants after they have developed some toilet training.

A further object of the present invention is to provide a combined children's potty seat and inverted step stool design of the class described which is strong in construction, as well as safe and convenient to use.

A further object of the present invention is to provide a convertible children's potty seat and a step stool where the mounting means of the potty seat do not hinder or trip the child when using the step stool.

A further object of the present invention is to provide a combined potty seat and step stool where the rear portion of the seat is cut out so that when the seat is inverted and used as a step stool, the stool has a telescoping relationship with the base of the toilet bowl.

A still further object of the present invention is to provide a combined potty seat and step stool of the class described with pivoted hook members which have a first retracted, stored position and a second extended position for making locking engagement with the outer edge of the toilet seat.

SUMMARY OF THE INVENTION

The present invention provides a combined children's potty seat and step stool where there is a seat portion and a pair of opposite side arm portions. The underside of the seat portion includes mounting means near the rear of the seat for making a locking engagement with a toilet bowl so the potty seat is safe from accidental displacement. The rear edge of the seat portion has a large cutout so that when the potty seat is inverted and positioned on the floor to be supported by the side arm portions, the cutout will receive the base of the toilet bowl and accommodate a young child standing on the inverted potty seat in the manner of a step stool so that the child may reach the toilet bowl.

BRIEF DESCRIPTION OF THE DRAWINGS

This invention will be better understood from the following description taken in conjunction with the accompanying drawings and its scope will be pointed out in the appended claims.

FIG. 1 is a fragmentary, perspective view of a standard toilet bowl having a toilet seat in its lowered position where the seat is supporting a combined children's potty seat and step stool of the present invention which is locked in place on the toilet seat.

FIG. 2 is a top plan view on an enlarged scale showing the combined children's potty seat and step stool of the present invention mounted on the toilet seat, as shown in FIG. 1.

FIG. 3 is a transverse, cross-sectional, elevational view of the potty seat of the present invention taken on the line 3—3 of FIG. 2.

FIG. 4 is a top plan view of the potty seat of the present invention when it is inverted and positioned on the floor closely adjacent the front of the toilet bowl and when it is to be used as a step stool. Notice the interlocking or telescoping cooperation between the rear portion of the step stool and the base of the toilet bowl, as well as the positioning of the opposing pivoted hook members in their retracted, stored position so that the underside surface of the seat portion is generally free of upward-extending obstructions when the step stool is to be used by small children for standing purposes.

FIG. 5 is a fragmentary, cross-sectional, elevational view of one side edge of the potty seat of the present invention shown in its inverted position with one of the pivoted hook members in its retracted, stored position, as taken on the line 5—5 of FIG. 4.

FIG. 6 is a fragmentary, exploded view of a portion of the potty seat of the present invention showing the nature of the recess in the underside surface of the seat portion and also the configuration of the pivoted hook member and how it would be mounted to the seat portion for pivotal movement through an arc of about 180 degrees.

FIG. 7 is another fragmentary, cross-sectional, elevational view of one side of the potty seat taken on the line 7—7 of FIG. 2 and showing the pivoted hook member in its extended locking position with the outer edge of the toilet seat.

DESCRIPTION OF THE PREFERRED EMBODIMENTS

Turning now to a consideration of the drawings, and, in particular, to the fragmentary perspective view of FIG. 1, there is shown a standard toilet bowl 10 having a base 12 which is supported on the floor 14. A standard toilet seat 16 is shown in its lowered position. The toilet seat cover 18 is shown in its raised, generally vertical position, resting against the elevated flush tank 20.

Supported on the toilet seat 16 is a combined children's potty seat and step stool 24 of the present invention. This potty seat 24 has a horizontal seat portion 26 with a central opening 28 that is adapted to be aligned over the top opening 30 of the toilet seat 16. The potty seat 24 has side arm portions 32 and 34 which are generally parallel that generally serve to prevent the infant from sliding off the seat.

As is best seen in the top plan view of FIG. 2, the rear edge of the seat portion 26 has a large cutout 38. The purpose of this cutout 38 is best illustrated in FIG. 4 when the potty seat 24 is inverted and supported on the floor 14 closely adjacent the base 12 of the toilet bowl 10. Thus, it will be seen that the cutout 38 will receive or accommodate the base 12 of the toilet bowl therein, so that a child standing on the inverted potty seat or step stool will be close enough to reach the toilet bowl without discomfort. Going back to FIG. 2, it will be seen that the side arm portions 32 and 34 are provided with a transverse backrest 40 which is arranged in the same vertical plane as the frontmost edge 42 of the cutout portion 38. This backrest serves to help position the infant on the seat portion 26, as well as serves to strengthen the side arm portions 32 and 34. Notice also that this transverse backrest 40 is positioned forwardly of the rear ends 32' and 34' of the side arm portions 32 and 34 respectively. The purpose of this is best seen in FIG. 4 where the potty seat 24 is shown in its inverted step stool position, and you will notice that the rear ends 32' and 34' of the side arms serve to straddle the sides of the base 12 of the toilet bowl and thereby steady the step stool against inadvertent displacement. Notice in this FIG. 4 the large front corner areas 44 and 46 at each side of the central opening 28, which areas are most convenient to serve as a step or platform for a child who wishes to use the toilet bowl. Likewise notice that there are no other incumberances in the area of these two foot portions 44 and 46. For ease in understanding the purpose of this step stool, the front corner areas are shown in dotted lines as a shoe print.

Turning back to the top plan view of FIG. 2, a discussion will now be furnished of the mounting means for the potty seat on the toilet seat 16. The mounting means comprises three elements. First, there is a downward projection 50, which is shown in dotted lines in FIG. 2 as being located beneath the transverse backrest 40 at the center thereof and is adapted to bear against the adjacent inner edge 52 of the toilet seat opening 30. The depth of this downward projection 50 can best be understood from the cross-sectional, elevational view of FIG. 3. In other words, it is of short depth. The other two elements of the mounting means that cooperate with the downward projection 50 are an opposing pair of pivotally-mounted, flexible hook members 54 and 56; again, as best seen in FIG. 3, which are mounted to the underside of the seat portion 26. The true nature of these two pivoted hook members 54 and 56 can best be understood with relation to FIGS. 4-7.

Turning first to FIGS. 5 and 6, the potty seat is shown in its inverted step stool position, and the hook member 56 is shown as comprising a hinge plate 58 having a pair of trunnions 60 at one end thereof which are adapted to slip into the mating bearings 62 formed in the underside of the seat portion 26 by means of a snap fit. The preferred embodiment of the present invention is formed of a molded plastic material which has some resilience and flexibility. It is not a solid plastic construction, but a hollow plastic construction, and notice there is a storage recess opening 64 in the underside of the seat portion for accommodating the hinge plate 58 of the hook member 56 therein. This hinge plate has on its underside in FIG. 6 a downwardly-extending hook 66 that is stowed away in the recess 64 in the first retracted, stored position, as is best seen in FIG. 5. When in this position the hinge plate 58 is flush with the underside of the seat portion 26, as is best seen in FIGS. 4 and 5.

When the hook member 56 is to be locked with the edge of the toilet seat 16, the hook members are pivoted through an angle of about 180 degrees until they assume the second extended locking position, as is best seen in FIGS. 3 and 7. Because the hook members 54 and 56 is formed of a thin thermoplastic material, it has flexibility which enables it to slip over the outer edge of the toilet seat 16 and the hook portion 66 to fit under the edge, as is best seen in FIG. 7, to give a good locking action. Notice in the top plan view of FIG. 2 that there is a 3-point locking action between the potty seat 24 and the toilet seat 16 in the form of the downward projection 50 and the pair of pivotally-mounted hook members 54 and 56 which are all three located near the rear portion of the potty seat, as can be seen in the top view of FIG. 2 and the inverted view of FIG. 4. This location of the mounting means towards the rear is particularly useful when the potty seat is used as a step stool in the inverted position of FIG. 4, so that the child's feet, depicted by the dotted line shoe prints 54 and 56, do not trip over any upward obstructions.

As is well known in this art, a separate, removable deflector (not shown) could be mounted at the front of the opening 28 of the potty seat for use by small boy infants to prevent discharge out onto the floor. It is not felt necessary to illustrate this feature since it is somewhat conventional and it does not form part of the present invention.

Another feature would be the use of a two-piece strap (not shown) that would be fastened to the front edge of each side arm portion 32 and 34 and would be provided with a buckle so that after the infant were seated in the potty seat, the strap could be buckled so that the infant would not be able to rise from the seat until the parent gave permission. It would be working somewhat like a seat belt to hold the child in place until permission is granted to change position. A flexible strap could be substituted for the rigid transverse backrest 40 without departing from the present invention.

Modifications of this invention will occur to those skilled in this art. Therefore, it is to be understood that this invention is not limited to the particular embodiments disclosed, but that it is intended to cover all modifications which are within the true spirit and scope of this invention as claimed.

What is claimed is:

1. A combination children's potty seat and step stool comprising:

(a) a seat portion and a pair of opposite side arm portions, the seat portion including a central opening that is adapted to be aligned over the top opening of a toilet bowl when the potty seat is positioned on the toilet bowl;

(b) and mounting means associated with the underside of the seat portion near the rear of the seat portion for mounting the potty seat to the toilet bowl in a locked position so the potty seat is safe from accidental displacement from the toilet bowl;

(c) the rear edge of the said seat portion having a large cutout so that when the potty seat is inverted and positioned on the floor closely adjacent the front of the toilet bowl, the said cutout will receive the base of the toilet bowl therein and accommodate a child to stand on the inverted potty seat in the manner of a step stool.

2. The invention as recited in claim 1, wherein the said pair of opposite side arm portions are provided with a transverse backrest portion which is positioned forwardly of the rear end of the side arm portions and adjacent the frontmost edge of the said rear cutout, so that when the potty seat is inverted and used as a step stool, the rear ends of the side arm portions straddle the sides of the base of the toilet bowl and serve to steady the step stool against inadvertent displacement.

3. The invention as recited in either claims 1 or 2, wherein the said mounting means for the potty seat is located near the rear portion of the potty seat only and is adapted to lock the potty seat to a toilet seat of the toilet bowl, said mounting means comprising a first downward projection on the underside of the seat portion at a central rear location to extend down into the opening of a toilet seat and bear against the adjacent edge of the opening in a locating manner, and a pair of releasable hook members on the underside of the seat portion for edges of the toilet seat and gripping the edge thereof in a 3-point locking action in cooperation with the said downward projection.

4. The invention as recited in claim 1, wherein the said mounting means for the potty seat is located near the rear portion of the underside of the seat only, and is adapted to lock the seat to a toilet seat of the toilet bowl, said mounting means comprising a first downward projection at a central rear location to bear against an adjacent inner edge of the toilet seat opening in a locating manner, and an opposing pair of pivotally-mounted, flexible hook members mounted to the underside of the seat, each hook member having a first retracted, stored position and a second extended locking position for gripping the outer edge of the toilet seat, so that when the potty seat is inverted and used as a step stool, the hook members are retracted and the underside surface of the seat portion is generally free of upward-extending obstructions.

5. The invention as recited in claim 4, wherein the underside surface of the seat portion has storage recesses formed therein for receiving the pivoted hook members in a generally flush arrangement in their first retracted position, whereby each hook member is pivoted through an angle of about 180 degrees into its second extended locking position.

* * * * *